Figure 4:
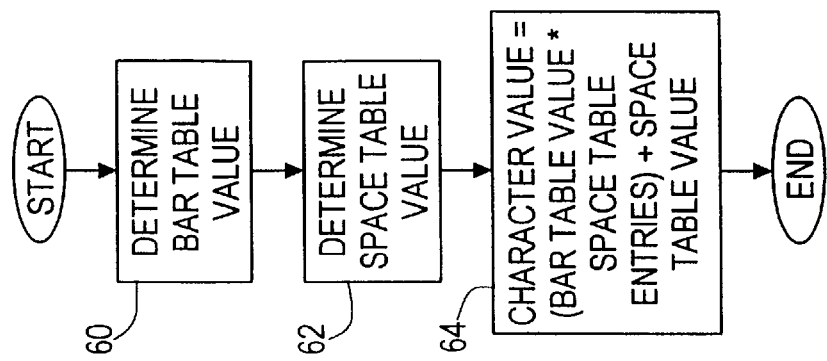

United States Patent [19]
Williams

[11] Patent Number: 5,992,745
[45] Date of Patent: Nov. 30, 1999

[54] N, K STRUCTURE BAR CODE CHARACTER VALUE DETERMINATION METHOD AND SYSTEM

[75] Inventor: Theodore C. Williams, Acton, Mass.

[73] Assignee: Uniform Code Council, Inc., Dayton, Ohio

[21] Appl. No.: 08/846,629

[22] Filed: Apr. 30, 1997

[51] Int. Cl.⁶ .................................................. G06K 7/10
[52] U.S. Cl. .......................... 235/462.16; 235/462.19; 235/494
[58] Field of Search ................... 235/462.07, 462.16, 235/462.18, 462.19, 494

[56] References Cited

U.S. PATENT DOCUMENTS

| | | | |
|---|---|---|---|
| 4,356,389 | 10/1982 | Quirey et al. ........................... | 235/455 |
| 5,468,946 | 11/1995 | Oliver ...................................... | 235/462 |
| 5,619,027 | 4/1997 | Ackley ..................................... | 235/462 |
| 5,740,285 | 4/1998 | Bloomberg et al. .................... | 382/299 |
| 5,764,170 | 6/1998 | Nabeta et al. ............................ | 341/95 |

*Primary Examiner*—Michael G. Lee
*Assistant Examiner*—Diane I Lee
*Attorney, Agent, or Firm*—Landiorio & Teska

[57] ABSTRACT

A method and system of determining the character value of an n,k structured bar code. A first table is established to include entries wherein each entry has a number of bar width values representing a unique high order value. A second table is established to include entries wherein each entry has a number of space width values representing a unique low order value. The entries of each table are searched to determine a high order value and a low order value.

6 Claims, 1 Drawing Sheet

N, K STRUCTURE BAR CODE CHARACTER VALUE DETERMINATION METHOD AND SYSTEM

FIELD OF INVENTION

This invention relates to a method of determining or decoding the character value of an n,k structured bar code.

BACKGROUND OF INVENTION

Bar code scanning systems generally include a scanner connected to a computer which has a look-up table that allows a software algorithm to decode the bar code. The look-up table includes a number of unique entries each representing a particular character value. For example, one entry may be that a bar two modules wide, followed by a space two modules wide, followed by a bar two modules wide, followed by a space one module wide equates to a character value of "8." When the scanner detects this particular sequence of bars and spaces, the algorithm searches the look-up table until that particular entry (e.g. 2,2,2,1=8) is found and then outputs the decoded value of "8."

In this particular example, the bar code has an "n, k" structure of 7,2 where n, equal to 7, is the total number of modules in the bar code, each 1–x wide and k, equal to 2, is the total number of bars which is also equal to the total number of spaces in the bar code. Each character value (e.g. 8) is made up of a plurality of bars and spaces and each bar and each space is made up of one or more modules of the same color type.

The look-up table in this example then contains 20 entries wherein each entry contains a unique bar/space pattern and an associated unique character value.

Since most products and services available for sale are now identified via a bar code with a unique product number, since the bar code must also contain a variety of other information about the product (e.g. manufacturing data, weight, lot number, etc.), and since UPC-E 7,2 n,k and EAN-8 bar code structures have a capacity of only 7–8 characters, the unique product numbers are quickly running out.

Accordingly, the EAN/UPC 7,2 n,k bar code structures are being replaced with n,k structures on the order of 21,6 and 29,8, the former representing 21 total modules and 6 bars and 6 spaces per character. The look-up table for this larger n,k structure, however, is enormous. For example, the look-up table for the 21,6 n,k structure contains 74,256 entries. At point of sale bar code scanning, such a large look-up table necessarily results in an inordinate amount of processing time before a match is found, and also requires a significant amount of memory address space.

SUMMARY OF INVENTION

It is therefore an object of this invention to provide an n,k structure bar code character value determination methodology and system for large n,k bar code structures.

It is a further object of this invention to provide such a method and such a system which significantly reduces the number of entries in the look-up table used by the scanning algorithm to decode the bar code.

It is a further object of this invention to provide such a methodology and system which results in a significant savings of processing time.

It is a further object of this invention to provide such a methodology and system which saves a significant amount of memory address space.

This invention results from the realization that instead of constructing one large look-up table for high order n,k bar codes structures, two smaller look-up tables can be established: one with bar entries and one with space entries and then a mathematical relationship can be made to exist between the bar table entries and the space table entries so that once each smaller look-up table is searched, a calculation can be used to decode the bar code character value based on the two table entries. The sum total of the space look-up table and bar look-up table entries is significantly less than the number of entries required in a large look-up table containing all possible combinations of spaces and bars thus saving a significant amount of memory address space and processing time.

This invention features a method of determining a character value of an n,k structured bar code. The method comprises establishing a first table including x entries, each entry comprising a plurality of bar width values representing a unique high order value; establishing a second table including y entries, each entry comprising a plurality of space width values representing a unique low order value; searching the entries of each table to determine a high order value and a low order value representing the character value; and calculating the character value by multiplying the high order value by y and then adding the low order value.

This invention also features a system for determining a character value of an n,k structured bar code. The system comprises a first memory address space including a first table comprising x entries, each entry including a plurality of bar width values representing a unique high order value; a second memory address space including a second table comprising y entries, each entry including a plurality of space width values representing a unique low order value; means for searching the entries of each table to determine the high order value and the low order value representing the character value; and means for calculating the character value by multiplying the high order value by y and then adding the low order value.

In a broader sense, this invention features a method of determining a character value of a bar code, the method comprising: establishing a first set of entries representing bar width values, the first set of entries also including a plurality of high order values, one assigned to each entry; establishing a second set of entries representing space width values, the second set of entries also including a plurality of unique low order values, one assigned to each entry; and means for determining the character value based on the high order value and the low order value. The method preferably includes the step of searching the first and second set of entries to determine a high order value and a low order value representing the character value and the step of determining includes calculating the character value by multiplying the high order value by the number of entries in the second set of entries and then adding the low order value.

There is also a system for determining a character value of a bar code comprising: a first set of entries representing bar width values, the first set of entries also including a plurality of unique high order values, one assigned to each entry; a second set of entries representing space width values, the second set of entries also including a plurality of unique low order values, one assigned to each entry; and means for determining the character value based on the high order value and the low order value. The system further includes means for searching the first and second set of entries to determine a high order value and a low order value representing the character value and the means for determining further includes means for calculating the character value by multiplying the high order value by the number of entries in the second set of entries and then adding the low order value.

DISCLOSURE OF PREFERRED EMBODIMENT

Figure 2:
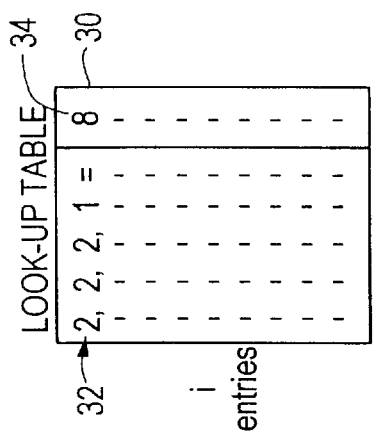
Figure 3:
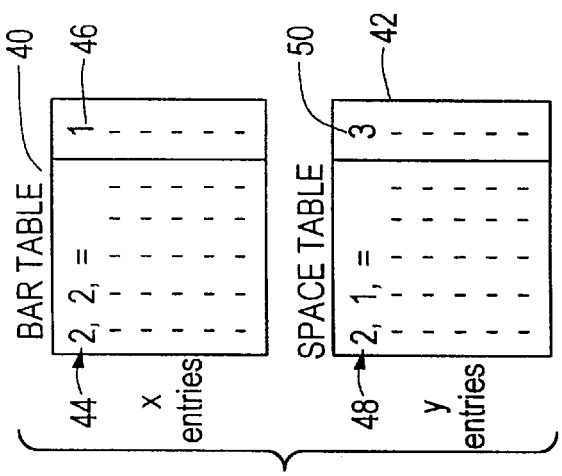
Figure 1:
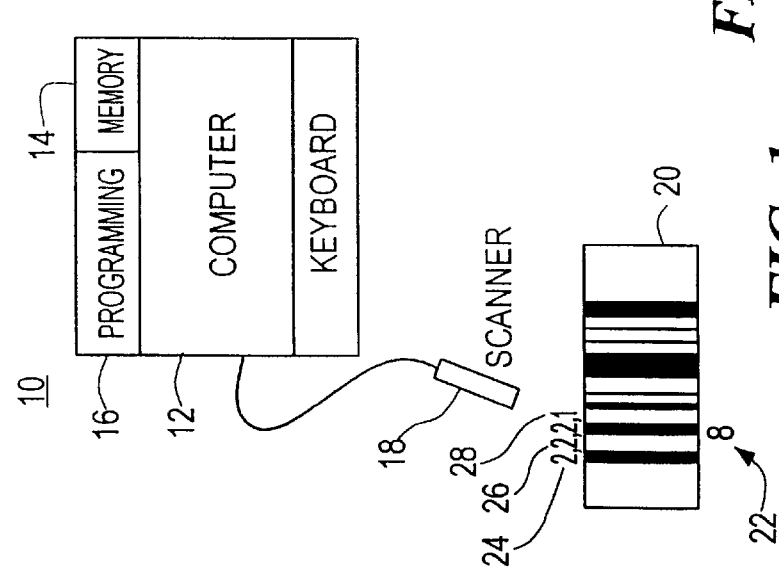

Other objects, features and advantages will occur to those skilled in the art from the following description of a preferred embodiment and the accompanying drawings, in which:

FIG. 1 a schematic view of the system of this invention for determining the character valuer n,k bar code structure;

FIG. 2 is a illustrative example of a prior art look-up table;

FIG. 3 an illustrative example of two smaller look-up tables in accordance with this invention;

FIG. 4 is a flow chart depicting the computer processing for determining the bar code character value using the two smaller look-up tables shown in FIG. 3 in accordance with this invention.

System 10, FIG. 1, for determining the character value of an n,k structured bar code includes computer 12, having memory 14 and programming 16 associated therewith. Connected to computer 12 is scanner 18 which reads bar code 20. Bar code 20 includes coded character values as shown at 22 made up of a number of bars, such as bar 24 and spaces, such as space 26. Each bar and each space is one or more modules of the same color. In this example, bar 24 is 2 modules wide and space 26 is also two modules wide, but space 28 is only one module wide.

This structure is known as a 7,2 n,k bar code structure as discussed in the Background of Invention above. Look-up table 30 then includes a number of entries such as entry 32 which has associated with it a character value 34, e.g. 8. Thus, scanner 18, FIG. 1, detects a two module wide bar, a two module wide space, another two module wide bar, followed by a one module wide space and programming 16 of computer 12 interfaces with table 30, FIG. 2, stored in memory 14 of computer 12, FIG. 1 to search through the entries until entry 32 is found. In this way, computer 12 is able to decode the character value 8 from the bar code pattern shown. For an n,k bar code structure of 7,2, table 30 has 20 entries.

For higher order n,k bar code structures, however, the number of entries may be in the thousands or even millions. For such a large look-up table, processing is extremely slow and memory 14, FIG. 1, of computer 12 must be extremely large. For example, an n,k structure bar code structure of 21,6 is made up of a 1 module wide black left quiet zone, a 1 module wide white left guard bar, a 21 module wide left data character consisting of 6 bars and 6 spaces, a 21 module wide left check data character consisting of 6 spaces and 6 bars, an 11 module wide left check character consisting of 4 bars and 4 spaces, a 2 module wide center pattern consisting of 1 space and 1 bar, an 11 module wide right check character consisting of 4 bars and 4 spaces, a 21 module wide right data character consisting of 6 bars and 6 spaces, a 1 module wide black right guard bar, and a 1 module wide white right quiet zone.

Each n,k=21,6 data character is a composite of a n,k=11,3 character encoded in the bars only and an n,k=10,3 character encoded in the six spaces. The 11,3 character bar widths are limited to 5 modules in width which has 246 valid combinations. The 10,3 character space widths are limited to 4 modules in width which has 120 valid combinations. Each data character has 246*120 combinations for a combined capacity of 29,520 combinations. The two characters give a combined symbol capacity of 29,520 *29,520=871,430,400.

To determine a data character value, the n,k bar character combinations, B, are numbered 0 through 245 and the space character combinations, S, are numbered 0 through 119. Then the value of the character, V, is:

$$V=(B*246)+S$$

The value of the symbol, S, is calculated from the left character value, $V_L$, the right character value, $V_R$, by the formula:

$$S=(V_L \cdot 29,520)+V_R$$

An n,k bar code structure of 29,8 is identical except that it has larger data characters and a larger center pattern. It consists of a 1 module wide black left quiet zone, a 1 module wide white left guard bar, a 29 module wide left data character consisting of 6 spaces and 6 bars, an 11 module wide left check character consisting of 4 spaces and 4 bars, a 6 module wide center pattern consisting of 3 spaces and 3 bars, an 11 module wide right check character consisting of 4 bars and 4 spaces, a 29 module wide right data character consisting of 6 bars and 6 spaces, a 1 module wide black right guard bar, and a 1 module wide white right quiet zone.

Each n,k=29,8 data character is a composite of a n,k=15,4 character encoded in the bars only and an n,k=14,4 character encoded in the six spaces. The 15,4 character bar widths are limited to 4 modules in width which has 3,144 valid combinations. The 14,4 character space widths are limited to 4 modules in width which has 1,428 valid combinations. Each data character has 3,144*1,428 combinations for a combined capacity of 4,489,632 combinations. The two characters give a combined symbol capacity of 4,489,632*4,489,632= 20,156,795,495,424.

To determine a data character value, the n,k bar character combinations, B, are numbered 0 through 3,143 and the space character combinations, S, are numbered 0 through 1,427. Then the value of the character, V, is:

$$V=(B*1,428)+S$$

The value of the symbol, S, is calculated from the left character value, $V_L$, the right character value, $V_R$, by the formula:

$$S=(V_L \cdot 4,489,632)+V_R$$

For the 21,6 structure, look-up table 30, FIG. 2, would include 74,256 entries. For the 29,8 structure, look-up table 30, FIG. 2, would include 17,094,792 entries. As discussed in the Background of Invention, above, such a large number of entries slows down processing time and requires a large volume of memory 14 in computer 12, FIG. 1.

In accordance with this invention, however, two look-up tables are constructed, bar look-up table 40, FIG. 3, and space look-up table 42. Bar table 40 includes x entries, such as entry 44 associated with high order value 46. Again, in this example, entry 44 denotes a bar having a width of two modules and another bar having a width of two modules representing unique high order value "1." Space table 42 includes y entries, such as entry 48 associated with unique low order value 50, in this example the number 3 which is associated with a space two modules wide and a space one module wide. Bar table 40 has 252 entries and space table 42 has 126 entries in the example of an n,k structure of 21,6 for a sum total of 378 entries as compared to 31,752 entries of prior art look-up table 30, FIG. 2. In the case of a 29,8 structure, bar table 40, FIG. 3 includes 3,144 entries and space table 42 includes 1,428 entries resulting in 4,572 total entries as compared to 4,489,632 entries required in prior art look-up table 30, FIG. 2.

The check characters have a 11,4 structure of which 10 combinations are selected for both even and odd parity, i.e. the number of modules in the bars being an even or odd number. The 10 values in the two characters result in a total of 100 values, of which only 97 are used.

To calculate the check value, the number of modules in each element in the two data characters is given a unique weight. The weighted sum of the elements is then reduced by modulo 97. The result is the value given the composite of the two check characters.

The symbols can be scanned one half at a time and then reconstructed by the reader to form a complete symbol. The guard bar, data character, check character, and center pattern can be decoded as a partial symbol (for either the left or right halves). The left and right halves can be differentiated by the odd or even parity of the bars in the data and check characters. The left characters are odd parity and the right characters are even.

The character value of the bar code is then determined in accordance with the following methodology. Once scanner 18, FIG. 1, reads bar code 20, programming 16 of computer 12 searches the entries of each table 40 and 42 to first determine the unique high order value (e.g. 1) of bar look-up table 40 and then the unique low order value (e.g. 3) of space look-up table 42, steps 60 and 62, FIG. 4. The character value is then the bar product of the bar table high order value times y (the number of space table entries) (e.g. 5) to which is added the low order value of the space table (e.g. 1*5=5+3=8). This calculation is accomplished by programming 16, FIG. 1 of computer 12 as shown in step 64, FIG. 4. The software for establishing bar table 40 and space table 50 is shown in appendix A to correctly make the above calculation work for the 7,2 structure.

The code operates as follows. N is defined first, in this case N is set to 11, and then 2K is set to 6. The program is run to generate the bar table entries. N is then set to 10 and 2K is set to 6 and the program is run again to establish the space table entries. To generate a bar code, the value desired is divided by Y, the number of space table entries. The result is the bar table entry and the remainder is the space table entry. A bar code generation routine is then used to generate a bar code by determining the sequencing and widths of the bars and spaces. For example, in the hypothetical table shown in FIG. 3, the computer code shown in Appendix A would generate bar table 40 with higher order 1 assigned to two bars each two modules wide and a low order value of 3 assigned to two spaces, one two modules wide and the next one module wide.

The character value 8 broken down into 8÷5=1 remainder 3. 1 is then the bar table high order value and the remainder 3 is the low order space table value. Note that all the entries of the space and bar tables then need not be generated since the programming shown in Appendix A could be used to quickly search for the high and low order values of interest and their associated bar and space width values. Thus, as shown in FIG. 3, the method of this invention includes determining a high order value such as 1 assigned to the 2,2 bar width combination, a low order value such as 3 assigned to the 2,1 space width combination; and determining the character value 8 based on the high order value of 1 multiplied by the number of total possible low order values (e.g. 5) plus the low order value of 3.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A method of determining a character value of an n,k structured bar code, the method comprising:
   establishing a first table including x entries, each entry comprising a plurality of bar width values representing a unique high order value;
   establishing a second table including y entries, each entry comprising a plurality of space width values representing a unique low order value;
   searching the entries of each table to determine a high order value and a low order value representing the character value; and
   calculating the character value by multiplying the high order value by y and then adding the low order value.

2. A system for determining a character value of an n,k structured bar code, the system comprising:
   a first memory address space including a first table comprising x entries, each entry including a plurality of bar width values representing a unique high order value;
   a second memory address space including a second table comprising y entries, each entry including a plurality of space width values representing a unique low order value;
   means for searching the entries of each table to determine the high order value and the low order value representing the character value; and
   means for calculating the character value by multiplying the high order value by y and adding the low order value.

3. A method of determining a character value of a bar code, the method comprising:
   establishing a first set of entries representing bar width values, said first set of entries also including a plurality of high order values, one assigned to each said entry;
   establishing a second set of entries representing space width values, said second set of entries also including a plurality of unique low order values, one assigned to each said entry; and
   means for determining the character value based on the high order value and the low order value, said means for determining including calculating the character value by multiplying the high order value by the number of entries in the second set of entries and then adding the low order value.

4. A system for determining a character value of a bar code, the system comprising:
   a first set of entries representing bar width values, said first set of entries also including a plurality of unique high order values, one assigned to each said entry;
   a second set of entries representing space width values, said second set of entries also including a plurality of unique low order values, one assigned to each said entry; and
   means for determining the character value based on the high order value and the low order value, said means for determining including means for calculating the character value by multiplying the high order value by the number of entries in the second set of entries and then adding the low order value.

5. A method for determining a character value of an n,k structured bar code, the method comprising:
   determining a high order value assigned to a bar width combination;

determining a low order value assigned to a space width combination; and determining the character value based on the high order value and the low order value, said step of determining the character value including multiplying the determined high order value by the total number of possible low order values and then adding the determined low order value.

6. A method for determining a character value of an n,k structured bar code, the method comprising:

determining a high order value assigned to a bar width combination;

determining a low order value assigned to a space width combination; and determining the character value based on the high order value and the low order value, the high order value and the low order value initially established by dividing the character value by the total number of possible low order values, the high order value being the quotient, the low order value being the remainder.

* * * * *